(12) United States Patent
Huang

(10) Patent No.: US 10,258,912 B2
(45) Date of Patent: *Apr. 16, 2019

(54) LOW PRESSURE LOSS DUST COLLECTORS

(71) Applicant: Federal Signal Corporation, Oak Brook, IL (US)

(72) Inventor: Xiaolun Huang, Naperville, IL (US)

(73) Assignee: FEDERAL SIGNAL CORPORATION, Oak Brook, IL (US)

( * ) Notice: Subject to any disclaimer, the term of this patent is extended or adjusted under 35 U.S.C. 154(b) by 413 days.

This patent is subject to a terminal disclaimer.

(21) Appl. No.: 14/686,387

(22) Filed: Apr. 14, 2015

(65) Prior Publication Data

US 2015/0251118 A1 Sep. 10, 2015

Related U.S. Application Data

(63) Continuation of application No. 13/790,874, filed on Mar. 8, 2013, now Pat. No. 9,027,202.

(51) Int. Cl.
*A47L 9/10* (2006.01)
*B01D 45/16* (2006.01)
*B01D 45/00* (2006.01)
*B01D 45/04* (2006.01)
*B01D 45/12* (2006.01)

(52) U.S. Cl.
CPC ............ *B01D 45/16* (2013.01); *B01D 45/00* (2013.01); *B01D 45/04* (2013.01); *B01D 45/12* (2013.01)

(58) Field of Classification Search
USPC ............................ 15/337, 345, 346, 353, 429
See application file for complete search history.

(56) References Cited

U.S. PATENT DOCUMENTS

| 3,978,656 A | 9/1976 | Murphy |
| 4,509,962 A | 4/1985 | Breitman et al. |
| 4,770,681 A | 9/1988 | Hilger et al. |
| 4,885,817 A | 12/1989 | Tanase |
| 4,928,480 A | 5/1990 | Oliver et al. |
| 5,647,092 A * | 7/1997 | Miwa ................. A47L 5/14 15/346 |
| 6,957,472 B2 * | 10/2005 | Illingworth ........... A47L 5/14 15/345 |
| 7,162,770 B2 | 1/2007 | Davidshofer |
| 7,296,395 B1 | 11/2007 | Hartman et al. |
| 7,637,699 B2 | 12/2009 | Albrecht |
| 7,927,408 B2 | 4/2011 | Sheoran et al. |
| 2002/0189451 A1 * | 12/2002 | Morgan ............... B04C 5/185 95/268 |

* cited by examiner

*Primary Examiner* — Joseph J Hail
*Assistant Examiner* — Shantese L McDonald
(74) *Attorney, Agent, or Firm* — McDonnell Boehnen Hulbert & Berghoff LLP

(57) ABSTRACT

Highly efficient particulate collectors, such as for dust and street debris collected by a mobile street cleaning vehicle, with very low pressure loss are disclosed. One embodiment uses a specially contoured passage to separate the solid particles from particulate-laden gas stream by rapid directional change at a throat region. By using the Venturi effect at the accelerating zone communicating with a gas return channel from the particulate retaining chamber, a small amount of the gas will be recirculated from the deposit zone to help move and retain the separated particles in a confined collection receptacle.

20 Claims, 8 Drawing Sheets

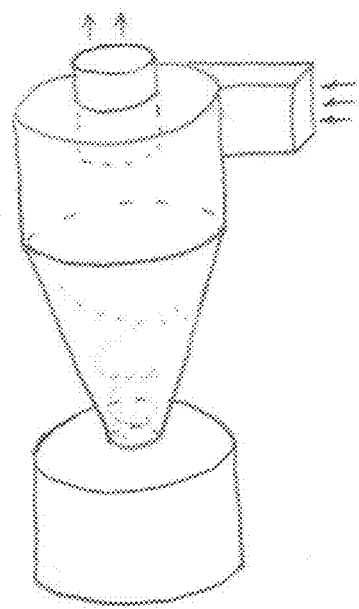
Fig.1 prior art - reverse flow cyclone separator
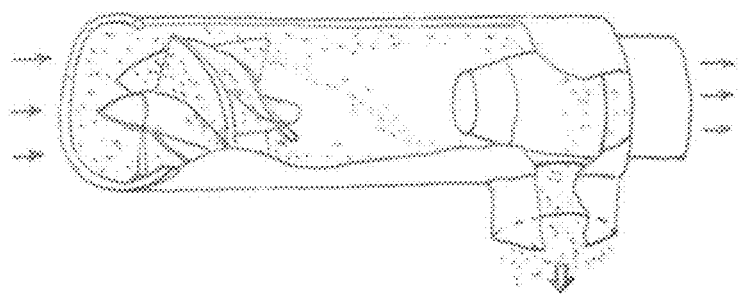
Fig.2 Prior art – co-current flow cyclone separator

LOW PRESSURE LOSS DUST COLLECTORS

CROSS-REFERENCE TO RELATED APPLICATIONS

The present application is a continuation of U.S. application Ser. No. 13/790,874 filed Mar. 8, 2013, the disclosure of which is explicitly incorporated by reference herein in its entirety.

FIELD OF THE INVENTION

The present disclosure generally relates to systems to separate and collect dust particles from gas stream and, more particularly, to dust collectors that remove particulates from high gas flow rate in industrial applications, such as may be used in mobile equipment in applications including street sweepers, sewage vacuum trucks and industrial vacuum trucks where low pressure loss, high separation efficiency, compactness, light weight, and reliability are highly demanded.

BACKGROUND

Using gas flow to clean and transfer materials is a flexible and convenient process in many industrial applications. However, an associated problem is how to effectively separate and remove fine solid particles (e.g., dust or sand) from the gas stream before exhausting the gas to the atmosphere, or before the gas reaches the power source (e.g., a fan or blower).

For mobile equipment, such as street sweepers, sewage trucks, and industrial vacuum trucks, this problem is especially challenging. Due to the limited availability of power and space, any dust separation device on mobile equipment should be highly efficient. In general, it should employ a low pressure drop, or decrease in suction power. Further considerations tend toward a compact and lightweight system, taking up little space with a reduced payload. Any dust separation device or system on mobile equipment should be reliable and have little down-time.

A common cyclone may cause a 12 to 14 inch water column pressure drop at a flow velocity of 70 feet per second. Such a device would not be very suitable for use on a street sweeper, where the maximum suction power is generally a 48 inch water column.

Many devices for removing materials entrained in a gas flow currently exist. Using filters can usually achieve high separation quality, but filters are also generally associated with high pressure loss, high cost, and maintenance. Filters may also have problems when dealing with high temperature gases, depending on the material of the filter. In comparison, mechanical separation devices such as inertial inlet separators and cyclones have many advantages. They are simple, low-cost, and generally maintenance-free. But while an inertial inlet separator is the simplest, it is generally limited by low separation efficiency and larger space demands to settle and collect dust.

Cyclones are another option. Most widely-used cyclones are reverse flow type, as shown in FIG. 1 of this disclosure. The dust-laden gas stream is introduced tangentially into a cylindrical barrel or chamber to generate rotational flow moving downward. Larger or heavier particles are forced to move outwardly to the walls and then fall into the dust collector at the bottom. In this version, the cleaned gas stream will then reverse direction at 180-degrees to exit from a tube at the top end. This type of cyclone is well-known in the art for its high efficiency, typically on the order of 90% or greater, depending on the application. However, one drawback of all traditional cyclones is that the high efficiency comes at the price of high pressure drop, especially in high flow velocity situations. To overcome this problem, one solution is to use multiple cyclones in parallel arrangement to reduce the flow to each cyclone so that the pressure loss is reduced. For this reason, it is not surprising to see an industrial vacuum truck having a row of 4 to 6 cyclones attached around the debris body to handle a flow in the range of 3000 to 5000 cubic feet per minute. But such an alternative leads to other problems, as it requires more space, parts, and often has difficulty evenly distributing flow between the cyclones.

Alternatively, co-current flow type cyclones, as shown in FIG. 2 of this disclosure, lead to less pressure loss but generally need a scavenging flow to most effectively remove the dust from the separator. Without a scavenging flow, the separation may decrease by 20% or even more. For applications such as engine inlet gas cleaning, it is common to use the engine exhaust gas to provide the needed scavenging flow. In a stationary application, such as gas cleaning system in a production plant, a powered suction passage with filters is sometimes used in a co-current cyclone. Further, co-current cyclones using guide vanes to generate spiral flow are generally more vulnerable to wear and tear by sand, or clogging due to paper, leaves, or rope in street sweeper applications.

When dust separators are used in a mobile vacuum equipment application, such as a street sweeper, the separated dust is typically maintained or stored within the equipment, instead of being exhausted into the environment. Using an extra suction source with filtration capability to collect dust, such as is often required in a co-current flow cyclone, is less attractive from both a power and space stand point.

SUMMARY

The disclosure herein generally relates to an improved apparatus, system and method for the separation and collection of dust particles from a gas stream.

In a first embodiment, a particulate collector apparatus is provided. The apparatus may include (1) a conduit structure having an inlet passage for conveying a particulate-laden gas stream, the passage having an upstream inlet opening with an internal cross-section of a first diameter and a second downstream diameter which is smaller than the first diameter to thereby form a throat of decreased internal cross-section in the inlet passage, (2) a separator positioned downstream of the throat, where the separator divides the inlet passage into an outlet channel and a particulate-collection channel, where the outlet channel and the particulate collection channel are diverging, (3) a partition extending from the second diameter of the throat, the partition beginning a distance from the second diameter to form a gap in the inlet passage, the partition forming a portion of the particulate-collection channel with the separator, and (4) a particulate-collection chamber positioned downstream of the particulate-collection channel, the particulate-collection chamber defining a space for collection of particulate matter, the chamber in fluid connection with the gap, whereby the particulate-laden gas stream flowing past the gap causes a recirculating gas flow from the chamber.

In accordance with the above, the first embodiment receives a particulate-laden (e.g. dust-laden) gas stream into an inlet passage and conveys it into a gradually narrowed conduit, so as to increase the velocity of the gas. At the throat of the tunnel is a rapid change in flow direction around a radial surface with relatively small radius. This is accomplished in this embodiment with minimum pressure losses, while separating heavier particles from the main flow path in view of the sudden change in flow direction and preferably also by a properly positioned separator or stream divider, located downstream of the throat. The particulates separated out at this point are collected in a chamber or similar particulate-containment chamber/vessel. This apparatus is considered to achieve over 85% collection efficiency on fine sand, for instance, at a pressure loss as low as a 0.45 inch water column at a flow rate of 70 ft/second.

An aspect of this embodiment in one form is a secondary flow which can be induced from the dust chamber. To this end, the throat zone has a wall with a gap, which forms a gas recirculation channel connecting to the chamber. As gas (e.g., air) velocity increases at the throat, lower pressure will occur at the gap, according to the Venturi effect. Some gas entering the dust chamber will thereby be pulled out of the chamber from the Venturi slot, generating a small amount of secondary flow. This secondary flow will help to move and keep the dust inside the chamber.

An advantage and benefit from the foregoing feature is that the dust collector apparatus can be relatively simple, compact, and suitable to apply in many places along a duct system. Exemplary applications inside a mobile cleaning vehicle, for instance, including a fan or blower to force air through the separators, a frame to support the other components and a set of wheels to move the vehicle. In some examples, the dust collector apparatus may be placed near the front of the vehicle, having a hinged door open and close by gravity or actuators to empty the dust along with other debris when tipping the debris body. It may also be placed near one side of the debris body and include a side door to access the collected dust from the side. The dust collector apparatus may also be positioned close to the rear end of the vehicle and use the tailgate of the debris body also as the dust chamber door so that both are discharged at the same time. These are just some examples.

In another embodiment, a method of separating particulate matter from a gas stream is provided. The method may include the steps of (1) conveying a particulate-laden gas stream through an inlet passage of a conduit structure, the passage having an upstream inlet opening with an internal cross-section of a first diameter and a second downstream diameter which is smaller than the first diameter to thereby form a throat of decreased internal cross-section in the inlet passage, (2) separating particulate matter from the particulate-leaden gas stream at a separator positioned downstream of the throat, where the separator divides the inlet passage into an outlet channel and a particulate-collection channel, where the outlet channel and the particulate-collection channel are diverging, (3) directing the particulate matter with a partition extending from the second diameter of the throat, the partition beginning a distance from the second diameter to form a gap in the inlet passage, the partition forming a portion of the particulate-collection channel with the separator, (4) collecting the particulate matter in a particulate-collection chamber positioned downstream of the particulate-collection channel, the particulate-collection chamber defining a space for collection of particulate matter, the chamber in fluid connection with the gap, and (5) causing a recirculating flow through the gas recirculation channel by way of the particulate-laden gas stream flowing past the gap.

In another embodiment, an apparatus for separating particulate matter from a gas stream is provided. The apparatus may include (1) a cylindrical body, the cylindrical body having a first cross-sectional diameter, a body top end, and a body bottom end, (2) an inlet passage tangentially entering the cylindrical body adjacent to the top end, and forming a cyclonic separation chamber with the cylindrical body, (3) an outlet passage tangentially exiting the cylindrical body adjacent to the bottom end, (4) a first tube, the first tube having a second cross-sectional diameter smaller than the first body diameter, a first tube upper end, and a first tube lower end, where the lower end of the first tube extends generally coaxially through the top end of the cylindrical body and past the inlet passage and into the cyclonic separation chamber, (5) a second tube, the second tube having a second tube upper end and a second tube lower end, where the upper end of the second tube extends through the bottom end of the cylindrical body into the cyclonic separation chamber and the second tube upper end is in general coaxial alignment with the first tube lower end, where the lower end of the first tube and the upper end of the second tube are separated by a gap, and (6) a particle-collection chamber communicating with the outlet passage, the chamber further having a gas passage channel extending from a chamber outlet to the upper end of the first tube and forming a gas recirculation channel.

When suction is applied to the lower, open end of the second tube of the foregoing embodiment, particulate-leaden gas (e.g. dust-laden gas) will enter the apparatus through the tangential inlet passage, turn around the cylindrical body and travel toward the other end. The first tube and a top end of the cylindrical body that is helical in shape will preferably funnel the flow smoothly to reduce turbulence and dead zones, minimizing pressure loss. Along the spiral stream, particulates will move towards the cylindrical body outer wall due to centrifugal force. Clean gas remains close to the center, and then exits from the second tube through the opening gap. Meanwhile, the highly dust-concentrated stream will continue to move downward until reaching a bottom end of the cylindrical body that is also helical in shape, and then exit tangentially from the outlet passage to the particle-collection chamber, or dust holder. Because the suction from the second tube can also cause vacuum pressure at the lower end of the first tube, a small amount gas flow will circulate through the dust holder and re-enter the cylindrical body via the gas passage channel and first tube. As a result, this embodiment provides an improved co-current cyclone to separate dust from a high rate gas flow with a self-contained scavenging feature to effectively move and collect dust.

Another aspect of this embodiment may employ a reverse flow cyclone as the dust holder, such that the cyclone inlet receives the dust concentrated flow from the dust outlet passage of the cylindrical body. The outlet of the reverse flow cyclone is connected to the outside open end of the first inner tube. As only small amount of gas flow will go through the reverse flow cyclone, a very low pressure drop would occur, resulting in better separation through the self-scavenging flow. Using this apparatus to collect PM10 powders, for example, it is considered that the efficiency can be over 98.5% at a pressure loss of only a 3.4 inch of water column at a flow rate of 70 ft/second.

In another embodiment, a method of separating particulate matter from a gas stream is provided. The method may include the steps of (1) conveying a particulate-leaden gas stream through an inlet passage, the inlet passage tangentially entering a cylindrical body having a first cross-sectional diameter, a body top end, and a body bottom end, where the inlet passage tangentially enters the cylindrical body adjacent to the top end and forms a cyclonic separation chamber with the cylindrical body, the cylindrical body further including (a) a first tube, the first tube having a second cross-sectional diameter smaller than the first body diameter, a first tube upper end, and a first tube lower end, where the lower end of the first tube extends generally coaxially through the top end of the cylindrical body and past the inlet passage and into the cyclonic separation chamber, and (b) a second tube, the second tube having a second tube upper end and a second tube lower end, where the upper end of the second tube extends through the bottom end of the cylindrical body into the cyclonic separation chamber and the second tube upper end is in general coaxial alignment with the first tube lower end, where the lower end of the first tube and the upper end of the second tube are separated by a gap, (2) separating particulate matter from the particulate-leaden gas stream in the cyclonic separation chamber, (3) directing the particulate matter to an outlet passage tangentially exiting the cylindrical body adjacent to the bottom end, (4) collecting the particulate matter in a particle-collection chamber communicating with the outlet passage, the chamber further including a gas passage channel extending from a chamber outlet to the upper end of the first tube and forming a gas recirculation channel, and (5) applying suction to the lower end of the second tube to force the particulate-leaden gas stream into the inlet passage and to cause a recirculating flow through the gas recirculation channel.

In general, the embodiments described above can achieve high collection efficiency and low pressure drop, yielding an improved apparatus, method and system particularly useful in mobile vacuum equipment. These as well as other aspects, advantages, and alternatives, will become apparent to those of ordinary skill in the art by reference to the following detailed description, taken in conjunction with the drawings, in which:

BRIEF DESCRIPTION OF THE DRAWINGS

FIG. 1 is a typical reverse flow cyclone separator;
FIG. 2 is a typical co-current flow cyclone separator.

DETAILED DESCRIPTION

In the following detailed description, reference is made to the accompanying Figures (Figs) which form a part thereof. In the Figures, similar symbols typically identify similar components, unless context dictates otherwise. The illustrative embodiments described in the detailed description are not meant to be limiting. Other embodiments may be utilized, and other changes may be made, without departing from the spirit or scope of the subject matter presented herein. It will be readily understood that the aspects of the present disclosure, as generally described herein and illustrated, can be arranged, substituted, combined, separated, and designed in a wide variety of different configurations, all of which are contemplated herein.

Various embodiments of the invention will now be described with reference to the Figures. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring of the relevant description of the various embodiments. The terminology used in the description presented below is intended to be interpreted in its broadest reasonable manner, even though it is being used in conjunction with a detailed description of certain specific embodiments of the invention.

Figure 3:
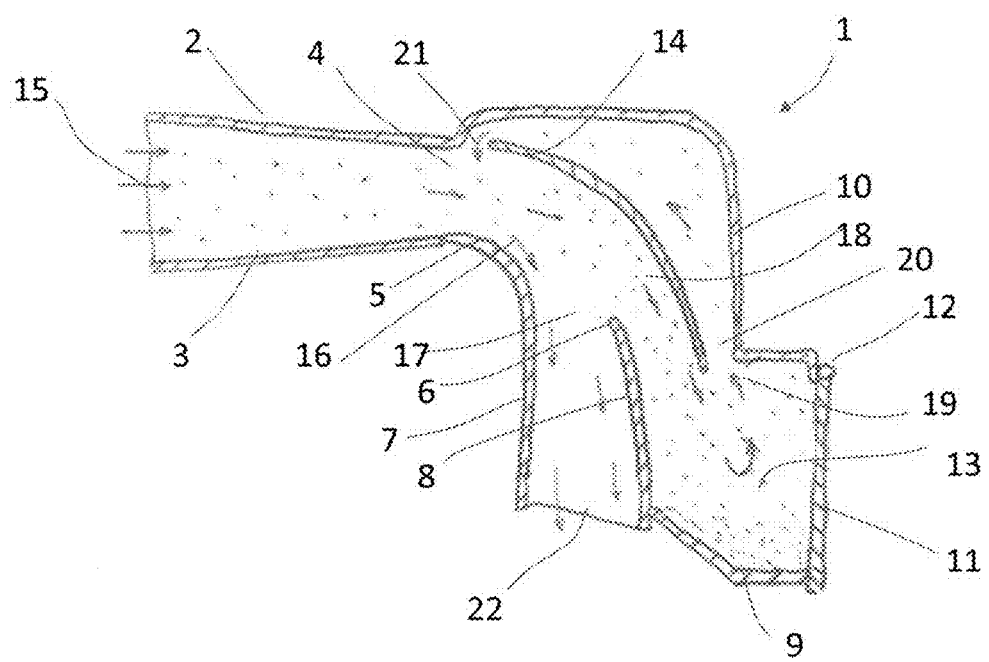
FIG. 3 is a cross-sectional schematic of an example embodiment suitable for use in an elbow duct arrangement.
Figure 8:
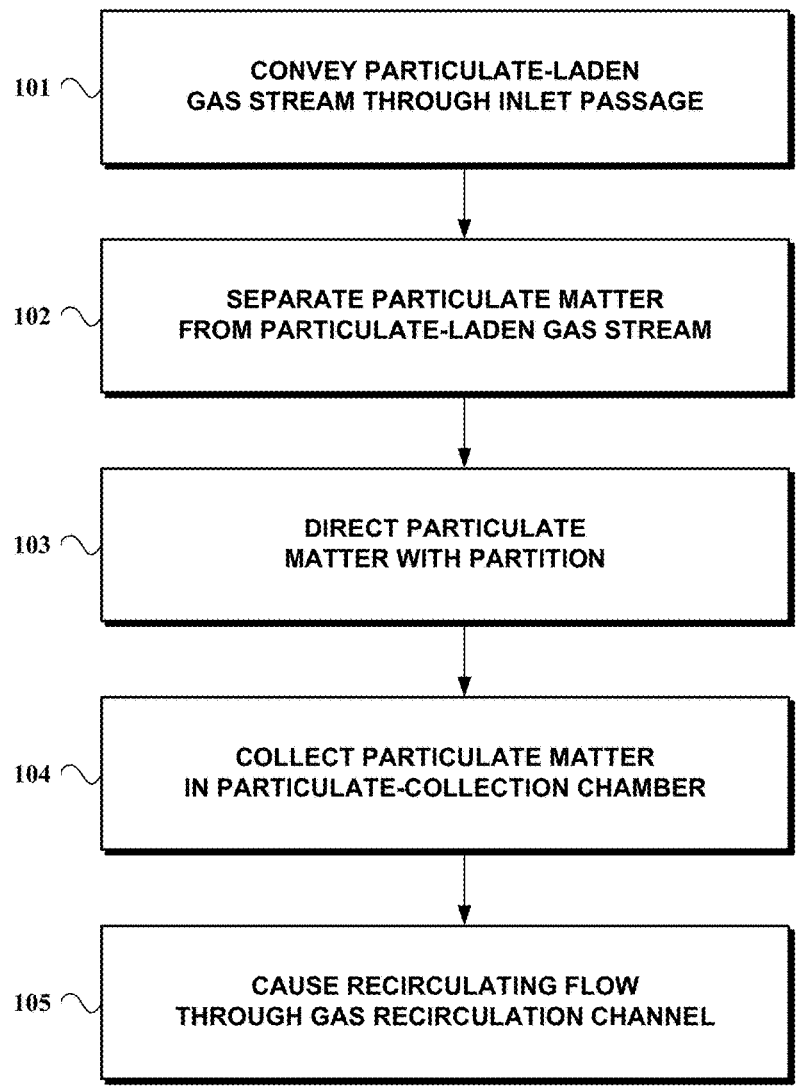
FIG. 8 is a flowchart depicting an example method according to an example embodiment.

Referring now to FIG. 3, a cross-sectional view of an example dust collector 1 is shown, and will be described below in conjunction with the method of FIG. 8. The dust collector 1 includes an inlet passage 15 and outlet channel 22 at approximately 90 degrees. Walls 2 and 3 (which shown here form a generally circular channel, with use of elements 2 and 3 merely to help in further orientation for the reader, it being understood that a single sidewall structure of any shape is intended) form a passage gradually narrowing from a first diameter to a second diameter in order to accelerate the dust-laden gas into the throat 4 of the dust collector 1. The bottom wall 3 then turns substantially 90 degrees with a small radius after the throat 4, following by another relatively straight wall 7. A curved partition wall 14 extends substantially from the end of wall 2 at throat zone 4, but leaving a gap 21, and then forms a portion of the turn in the inlet passage 22. The partition wall 14 also forms a portion of a particulate-collection channel 18 along with another wall 8.

Wall 8 is placed downstream of the throat 4, in the turn between walls 7 and 14 to create two diverging channels; the outlet channel 22 and the particulate collection channel 18. The upper tip 6 of wall 8 operates as the leading edge of a separator for the gas stream. When a dust-laden gas stream is conveyed 101 into the inlet passage 15, its velocity will gradually increase to the throat 4. In the elbow shaped chamber 16 of the dogleg, the gas will change direction rapidly, especially with the help of what is referred to as the Coanda effect. However, the heavier particles will not be able to make this turn due to inertial effects. As a result, the heavier dust is separated 102 from the main gas stream at separator tip 6. While clean gas will move inward at 17 and flow out from outlet channel 22 defined by walls 7 and 8, the dust will move outward and be directed 103 by partition wall 14 into the particulate-collection chamber 13 enclosed by walls 8, 9, and 10 for collecting 104 the particulate matter.

A cleanout door 11 is illustrated in this embodiment as hinged on the right-hand-side at 12. It will be understood that it can also be placed at the front, back or bottom sides as needed. Note that, especially as the chamber 13 may not be very large, which is often the case in mobile equipment, separated and collected dust may be difficult to settle in the chamber 13, and may move back up toward the separator tip 6 to rejoin the gas stream. This invention mitigates this problem by introducing a relatively small recirculating gas flow 19 through the chamber 13.

A gas recirculation channel 20 is formed behind the curved partition wall 14 and the chamber wall 10. Remember that partition wall 14 started after a gap 21 in the inlet upper wall at the throat 4. As the faster gas steam flows past the gap 21, lower pressure will be generated according to the Venturi effect. This will cause 105 a recirculating gas flow 19 to be induced out of the chamber 13, through the gas recirculation channel 20, and though the gap 21. In view of the relatively large and vertical nature of the channel 20, any fine dust sticking to the walls may easily fall into the chamber by shaking the chamber 13, or simply through the vibration often associated with mobile equipment.

Because of the turn, short path, and quick time to separate dust, the present example in various embodiments will have less loss due to friction and turbulence. In addition, due to the introduction of the internal recirculation flow, dust can more easily be moved into and retained inside a relatively small collection chamber. These features result in an effective and compact dust separation and collection device. The turn between the inlet passage 15 and the outlet passage 22 need not be exactly 90 degrees, but may vary between, for example, 75 and 95 degrees.

Figure 4:
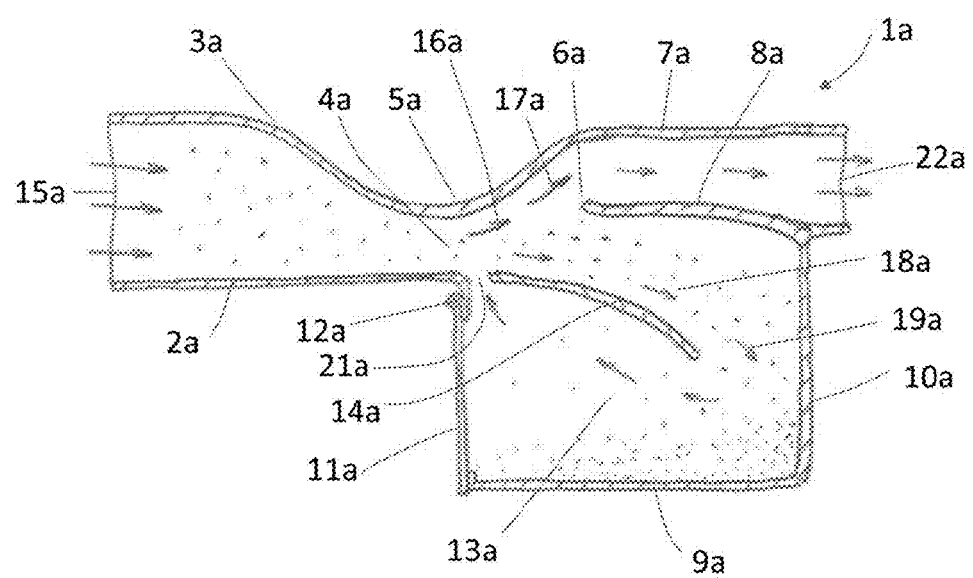
FIG. 4 is another cross-sectional schematic of an example embodiment suitable for use in a substantially straight duct arrangement.

Another alternative example 1a is presented in FIG. 4, which is especially suitable for an application where the inlet passage 15a and outlet channel 22a are generally in-line. Walls 2a and 3a form a channel of decreasing diameter to gradually increase the gas velocity. At the throat 4a, the upper wall 3a turns into curved wall 5a bending upward at an angle preferably between 70 to 90 degrees, followed by a generally smooth transition bending back in line with the inlet passage 15a, as shown at wall 7a. Tangentially extending from the lower wall 2a at throat 4a, but leaving a gap as presented by 21a, there is curved partition wall 14a. This wall is properly shaped to provide a smooth path and to direct the dust to fall into the dust chamber 13a at one end.

Between walls 7a and 14a there is another curved wall 8a, which will create two passageways—the upper, outlet channel for the clean gas stream and the lower, particulate-collection channel 18a for the dirty stream. In the upward turning chamber 16a, gas will change direction rapidly, again with the help of known Coanda effect, but the heavier particles will have difficulty doing so due to their inertia. The dust is separated from the curved gas stream and diverted from the main gas stream at separator tip 6a. While clean gas will move upward at 17a and flow out from outlet channel 22a defined by walls 7a and 8a, the dust will move generally in a straight path, and finally fall into the chamber 13a enclosed by walls 9a, 10a and a cleanout door 11a.

In this embodiment, an internal recirculating gas flow 19a through the chamber 13a is created by the gap 21a between the curved partition wall 14a and wall 2a at the throat 4a, according to the Venturi effect. Again, although the cleanout door 11a is illustrated in the figure of this embodiment as hinged on the left-hand side at 12a, it is easy to understand it may be used at the right-hand side, front, or back sides as needed.

Figure 5:
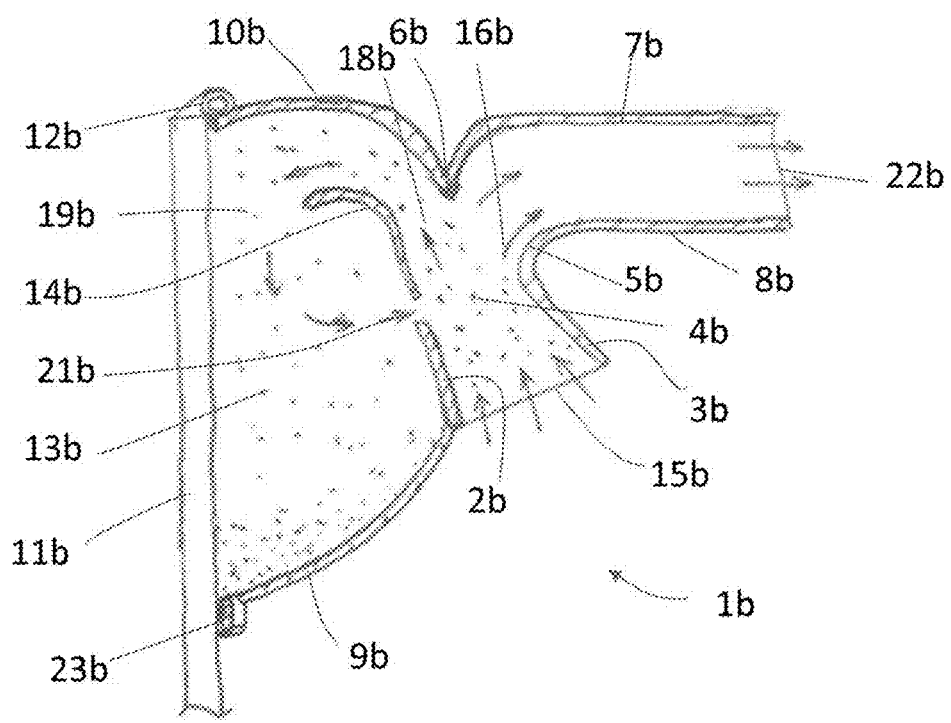
FIG. 5 is a cross-sectional schematic of another example embodiment.

Another alternative embodiment 1b of the invention is shown in FIG. 5. Here, the turn between the inlet passage 15 and outlet channel 22 is greater than 90 degrees. Other similar angles are also possible, for instance, between 95 and 120 degrees. An interesting aspect of this configuration is to use the debris hopper door of a mobile vacuum truck as a cleanout door 11b of the dust chamber 13b. Wall 2b serves as both the wall of inlet 15b and a part of the dust chamber 13b. After a gap 21b, this wall continues with a curved shape in partition wall 14b to guide the dust into the chamber 13b and keep it inside. Wall 3b, along with wall 2b, provide an inlet passage 15b of decreasing diameter to gradually accelerate the dust-laden gas. Wall 3b leads to a radius at 5b to cause the gas to change direction at 16b. While gas and fines may quickly follow the path with the help of the Coanda effect, more dense particles may not, and will separate from the gas stream to move along the particle-collection channel 18b. At the elbow area, separator tip 6b is where the outlet wall 7b and dust chamber wall 10b meet to divide the gas stream into clean and dust-concentrated branches. The clean gas stream proceeds to the outlet channel 22b formed by walls 7b and 8b. In this embodiment, the recirculating flow 19b through the dust chamber 13b starts at the Venturi gap 21b, located at the throat 4b. Wall 9b is the bottom portion of the chamber and includes a seal 23b to engage the rear door 11b. When the dust collector tilts along with the debris body, the door 11b will open and discharge the dust along with the other debris.

Figure 6:
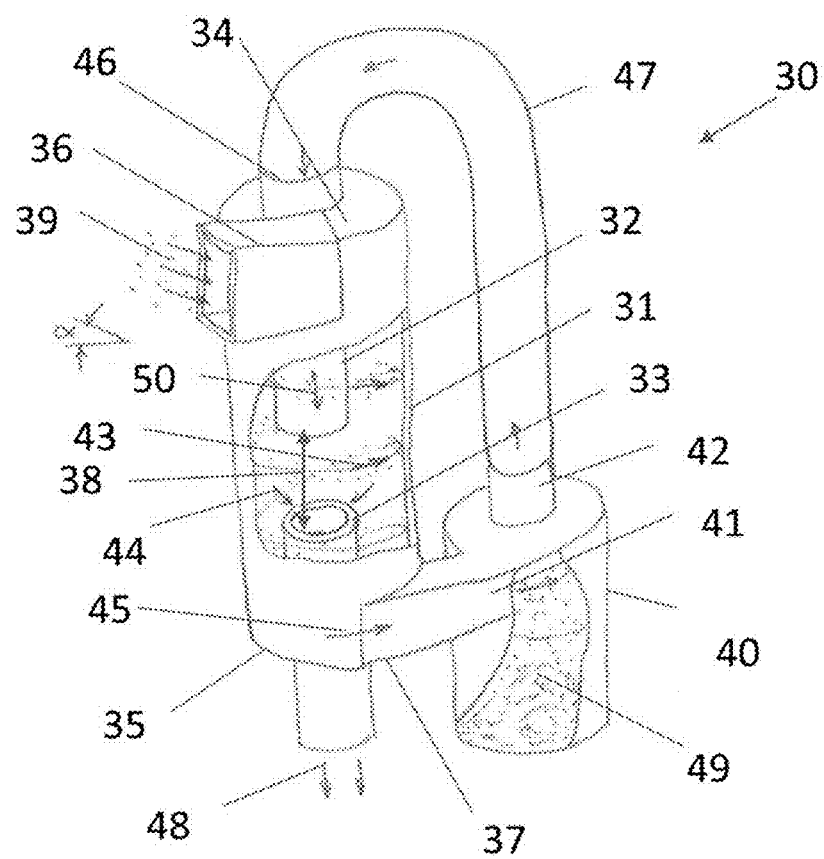
FIG. 6 is a perspective schematic of yet another example embodiment.
Figure 7:
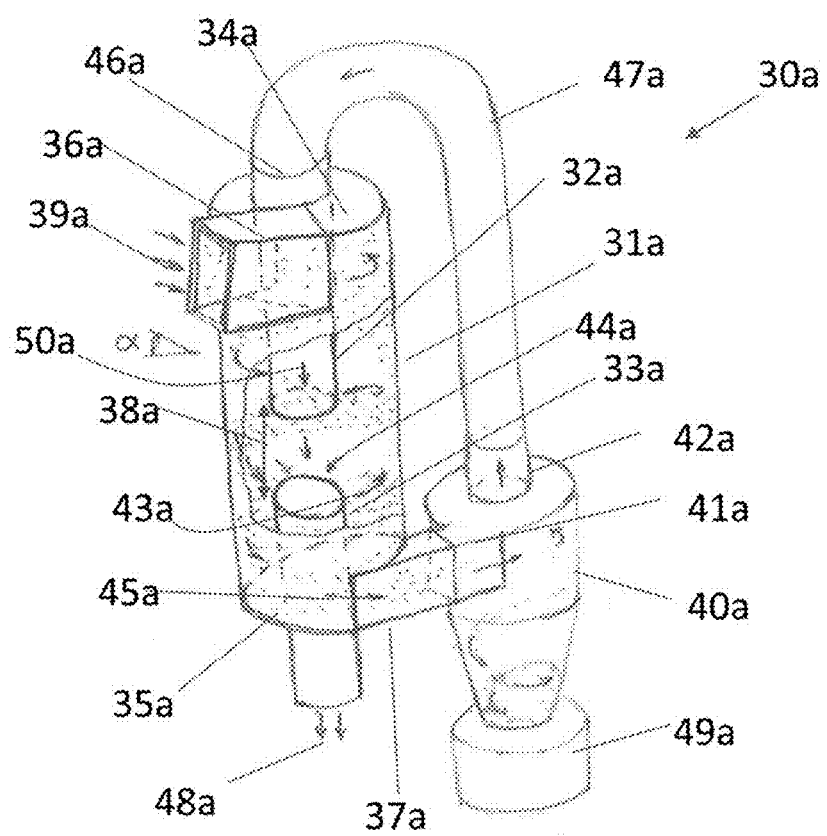
FIG. 7 is a perspective schematic of still another example embodiment.

To further effectively collect even smaller size particles with low pressure loss, another example dust collector 30 is presented in FIG. 6. The dust collectors shown in FIGS. 6 and 7 are oriented vertically, and the following description refers to corresponding parts as top and bottom to assist in the reader's understanding of the figures. However, it should be understood that the dust collectors shown in FIGS. 6 and 7 may take any orientation, in whole or in part. For example, the dust collector of FIG. 6 may be oriented substantially horizontally.

Generally, the example in FIG. 6 consists of a dust separator, a dust collector, and various passageways. The separator consists of a cylindrical body 31, a first tube 32 having a portion of its length coaxially inserted through the top end 34 of the cylindrical body 31. The separator also includes a second tube 33 inserted from the bottom end 35 of the cylindrical body 31 and axially aligned with the first tube 31. The first and second tubes have substantially the same diameter, and the ratio of the diameter of the first and second tubes 32, 33 to the diameter of the cylindrical body 31 may be between 1.75 and 3.

A gap 38 separates the lower end of the first tube 32 and the upper end of the second tube 33, and the gap 38 may have a distance between 0.75 and 2 times the diameter of the first and second tubes. The top end 34 and bottom end 35 of the cylindrical body 31 may be a helical in shape. An inlet passage 36 is tangentially connected to the cylindrical body 31 adjacent to the top end 34 and above the lower end of the first tube 32, forming a cyclonic separation chamber within the cylindrical body 31. The distance between the top end 34 and the lower end of the first tube 32 may be 2 and 5 times the diameter of the cylindrical body 31. Similarly, a dust outlet passage 37 is tangentially connected to the cylindrical body 31 adjacent to the bottom end 35 and below the upper end of the second tube 33.

Both inlet passage 36 and dust outlet passage 37 are preferably at a downward inclined angle alpha (as the reader views this Figure) between 15 to 30 degrees to the cylindrical body 31, to improve separation. A particle-collection chamber 40 generally has an inlet channel 41 connecting to the outlet passage 37 and a chamber outlet 42 connecting to the top end 46 of the first tube 32 via a gas passage channel 47. The particle-collection chamber 40 may also include a dust holder 49.

Figure 9:
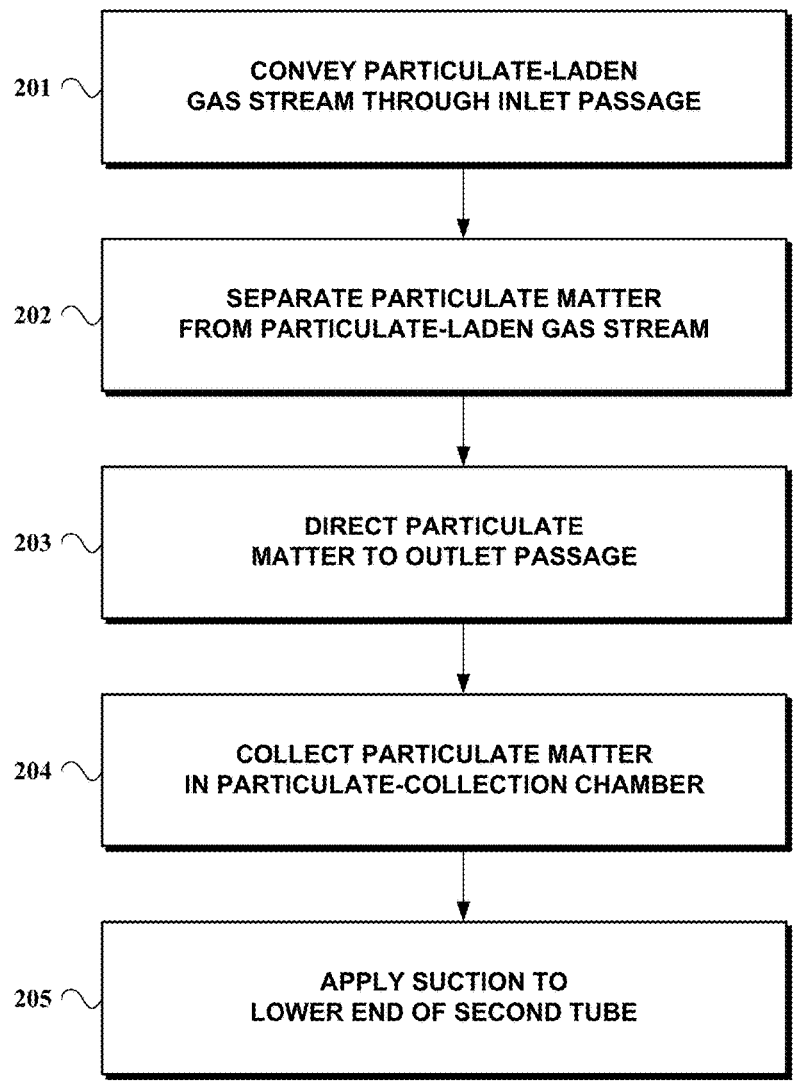
FIG. 9 is a flowchart depicting an example method according to another example embodiment.

Use of the dust collector 30 in FIG. 6 can be described in conjunction with the method of FIG. 9. When suction is applied 205 to the lower end 48 of the second tube 33, particulate-laden gas 39 will enter the dust collector 30 through the tangential inlet 36. The gas 39 is conveyed 201 to the cylindrical body 31, then swivels (or turns) around the cylindrical body 31 and travels toward the bottom end 35.

The first tube 32 and helical end 34 will funnel the flow smoothly to reduce turbulence and dead zones and minimize pressure loss. Along the spiral stream 43, particulates will be separated 202 from the gas stream and move toward the outer barrel wall due to centrifugal force. Clean (or cleaner) gas remains close to the center, and then exits from the second tube 33 through the opening 44 at gap 38.

Meanwhile, the highly dust-concentrated stream 45 will continue to be directed 203 downward until reaching the helical end 35 and exit tangentially to the particle-collection chamber 40, where it is collected 204. Because the suction applied 205 to the second tube 33 can also cause vacuum pressure at the lower end of the first tube 32, a small amount gas flow 50 will circulate through the particle-collection chamber 40 and re-enter the cylindrical body 31 via the gas passage channel 47 and first tube 32. Thus, it will provide a self-contained scavenging flow to move the dust out of the separation zone. This improved dust separation and collection apparatus provides low pressure loss and high efficiency.

A further embodiment 30a is presented in FIG. 7, in which the particle-collection chamber 40a uses a reverse flow cyclone, such that the scavenging flow 45a will result in further dust separation and collection. The cyclone inlet 41a receives dust concentrated flow 45a from the outlet passage 45a of the cylindrical body 31. The cyclone outlet 42a is connected to the top end 46a of the first tube 32a via a gas passage channel 47a. As only a small amount of flow will go through the reverse flow cyclone 40a, there will be a generally very low pressure drop that will occur, and better separation thereby results through the self-scavenging flow achieved. For a PM10 dust mixed air flow at rate of 70 ft/second, this device is considered to be able to achieve over 98.5% collection efficiency at a pressure loss only a 3.4 inch water column. In comparison, an equivalently sized typical reverse flow cyclone would cause a 13.4 inch water column pressure loss.

As noted above, each of the example dust collectors shown in FIGS. 3-7 may be included in a mobile vacuum vehicle. Such a vehicle may include a fan or blower to generate the vacuum source need to force a dust-laden gas stream into the dust collector's inlet passage 15. The vehicle may also include a cabin for a driver to control the vehicle, or it may be remotely or autonomously operated. Finally, the vehicle may include a frame to support the other components, and a set of wheels to move the vehicle.

Although the invention has been shown and described with respect to preferred embodiments thereof, it should be understood by those skilled in the art that various changes and omissions in the form and detail thereof may be made therein without departing from the spirit and the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A particulate separation apparatus comprising:
    a conduit structure having an inlet passage for conveying a particulate-laden gas stream, the inlet passage comprising:
        an upstream end comprising a first inlet passage wall and a second inlet passage wall positioned opposite the first inlet passage wall; and
        a downstream end, wherein a separator wall divides the downstream end of the inlet passage into i) an outlet channel formed by the first inlet passage wall and the separator wall, and ii) a particulate-collection channel formed by the second inlet passage wall and the separator wall; and
    a gap formed in the second inlet passage wall, wherein the gap is located between the upstream end of the inlet passage wall and the separator wall, and wherein the gap is in fluid connection with the particulate-collection channel such that a recirculating flow may recirculate from the particulate-collection channel into the inlet passage via the gap.

2. The apparatus of claim 1 wherein the outlet channel and the particulate-collection channel are diverging.

3. The apparatus of claim 1 further comprising a particulate-collection chamber positioned downstream of the particulate-collection channel.

4. The apparatus of claim 3 wherein the particulate-collection chamber comprises at least one cleanout door.

5. The apparatus of claim 1, wherein the first inlet passage wall comprises a curved wall portion, the curved wall portion extending between the upstream end of the inlet passage and the outlet channel.

6. The apparatus of claim 1 wherein the upstream end of the inlet passage and the outlet channel are generally in-line.

7. The apparatus of claim 1 wherein an angle between the upstream end of the inlet passage and the outlet channel is between 75 and 120 degrees.

8. The apparatus of claim 1, wherein the apparatus is part of a mobile vacuum system further comprising:
    a fan capable of providing a vacuum source to force a particulate-leaden gas stream into the inlet passage;
    a set of wheels capable of moving the mobile vacuum system; and
    a frame to support the apparatus of claim 1 and the fan, wherein the frame is further connected to the set of wheels.

9. The apparatus of claim 1, wherein the particulate separation apparatus is a first particulate separation apparatus, wherein the inlet passage is a first inlet passage, the first particulate separation apparatus further comprising:
    a second particulate separation apparatus positioned downstream of the first particulate separation apparatus, the second particulate separation apparatus comprising:
        a cylindrical body, the cylindrical body having a first cross-sectional diameter, a body top end, and a body bottom end;
        a second inlet passage tangentially entering the cylindrical body adjacent to the top end, wherein the second inlet passage is downstream of the outlet channel of the conduit structure;
        an outlet passage tangentially exiting the cylindrical body adjacent to the bottom end;
        a first tube, the first tube having a second cross-sectional diameter smaller than the first cross-sectional diameter, and a first tube lower end, wherein the lower end of the first tube extends generally coaxially through the top end of the cylindrical body; and
        a second tube, the second tube having a second tube upper end, wherein the upper end of the second tube extends through the bottom end of the cylindrical body, wherein the second tube upper end is in general coaxial alignment with the first tube lower end, and wherein the lower end of the first tube and the upper end of the second tube are separated by a gap.

10. A method of separating particulate matter from a gas stream comprising:
- conveying a particulate-laden gas stream through an inlet passage of a conduit structure, the inlet passage comprising:
  - an upstream end comprising a first inlet passage wall and a second inlet passage wall positioned opposite the first inlet passage wall;
  - a downstream end, wherein a separator wall divides the downstream end of the inlet passage into i) an outlet channel formed by the first inlet passage wall and the separator wall, and ii) a particulate-collection channel formed by the second inlet passage wall and the separator wall; and
  - wherein the conduit structure further comprises a gap formed in the second inlet passage wall, wherein the gap is located between the upstream end of the inlet passage wall and the separator wall, and wherein the gap is in fluid connection with the particulate-collection channel;
- separating particulate matter from the particulate-leaden gas stream;
- directing the particulate matter into the particulate-collection channel;
- conveying a portion of the particulate-leaden gas stream out of the conduit structure via the outlet channel; and
- causing, by way of the particulate-laden gas stream being conveyed past the gap, a recirculating flow from the particulate-collection channel to the inlet passage via the gap.

11. An apparatus for separating particulate matter from a gas stream comprising:
- a cylindrical body, the cylindrical body having a first cross-sectional diameter, a body top end, and a body bottom end;
- an inlet passage tangentially entering the cylindrical body adjacent to the top end;
- an outlet passage tangentially exiting the cylindrical body adjacent to the bottom end;
- a first tube, the first tube having a second cross-sectional diameter smaller than the first cross-sectional diameter, and a first tube lower end, wherein the lower end of the first tube extends generally coaxially through the top end of the cylindrical body; and
- a second tube, the second tube having a second tube upper end, wherein the upper end of the second tube extends through the bottom end of the cylindrical body, wherein the second tube upper end is in general coaxial alignment with the first tube lower end, and wherein the lower end of the first tube and the upper end of the second tube are separated by a gap.

12. The apparatus of claim 11 further comprising a recirculation channel, wherein the first tube further comprises a first tube upper end, and wherein the recirculation channel provides a fluid connection between the outlet passage and the upper end of the first tube.

13. The apparatus of claim 11 further comprising a particulate-collection chamber positioned downstream of the outlet passage.

14. The apparatus of claim 13 wherein the particulate-collection chamber comprises a reverse flow cyclone.

15. The apparatus of claim 11, wherein the apparatus is part of a mobile vacuum system further comprising:
- a fan capable of providing a vacuum source to force a particulate-laden gas stream into the inlet passage;
- a set of wheels capable of moving the mobile vacuum system; and
- a frame to support the apparatus of claim 9 and the fan, wherein the frame is further connected to the set of wheels.

16. The apparatus of claim 11 wherein the body top end is helical in shape at a downward angle of 15 to 30 degrees.

17. The apparatus of claim 11 wherein the body bottom end is helical in shape at a downward angle of 15 to 30 degrees.

18. The apparatus of claim 11 wherein the first and second tubes have substantially the same diameter, and wherein a ratio of the diameter of the first and second tubes to the diameter of the cylindrical body is between 1.75 and 3.

19. The apparatus of claim 11 wherein the first and second tubes have substantially the same diameter, and wherein the gap is between 0.75 to 2 times the diameter of the first and second tubes.

20. The apparatus of claim 11 wherein a distance between the body top end and the lower end of the first tube is between 2 and 5 times the first cross-sectional diameter.

* * * * *